(12) United States Patent
Booth et al.

(10) Patent No.: US 7,477,140 B1
(45) Date of Patent: Jan. 13, 2009

(54) SEE-THROUGH LIGHTED INFORMATION DISPLAY

(76) Inventors: Kenneth C. Booth, 2315 E. Jaeger St., Mesa, AZ (US) 85213; Kael Duaine Burden, 4946 E. Grandview St., Mesa, AZ (US) 85205

( * ) Notice: Subject to any disclaimer, the term of this patent is extended or adjusted under 35 U.S.C. 154(b) by 0 days.

(21) Appl. No.: 11/924,534

(22) Filed: Oct. 25, 2007

Related U.S. Application Data

(63) Continuation of application No. 10/746,956, filed on Dec. 26, 2003, now abandoned.

(51) Int. Cl.
*B60Q 1/52* (2006.01)

(52) U.S. Cl. .................. 340/471; 340/479; 340/464; 340/468; 340/475; 340/463; 345/55; 345/82; 345/903

(58) Field of Classification Search ............ 340/471, 340/479, 464, 468, 475, 463; 345/55, 82, 345/903
See application file for complete search history.

(56) References Cited

U.S. PATENT DOCUMENTS

| | | | |
|---|---|---|---|
| 4,449,167 A | 5/1984 | Cohen | |
| 4,470,214 A | 9/1984 | Kinloch | |
| 4,868,542 A | 9/1989 | Thompson | |
| 4,928,084 A | 5/1990 | Reiser | |
| 4,929,936 A | 5/1990 | Freidman et al. | |
| 5,216,324 A | 6/1993 | Curtin | |
| 5,291,316 A | 3/1994 | Haberman et al. | |
| 5,307,578 A | 5/1994 | Fichtenau | |
| 5,412,891 A | 5/1995 | Black et al. | |
| 5,601,361 A | 2/1997 | Lawrence | |
| 5,604,480 A | 2/1997 | Lamparter | |
| 5,648,756 A | 7/1997 | Zadok | |
| 5,706,022 A | 1/1998 | Hato | |
| 5,715,619 A | 2/1998 | Polisois et al. | |
| 5,800,290 A | 9/1998 | Barry | |
| 5,900,850 A | 5/1999 | Bailey et al. | |
| 5,988,646 A | 11/1999 | Fair | |
| 5,996,263 A | 12/1999 | Black | |
| 6,178,677 B1 | 1/2001 | Williams | |
| 6,237,290 B1 | 5/2001 | Tokimoto et al. | |

(Continued)

OTHER PUBLICATIONS

Title of Article; Transparent LED Display; Title of Item: webpage (1 page); Publisher: Video Systems: Date: Nov. 1, 2000.

(Continued)

*Primary Examiner*—Tai T Nguyen
(74) *Attorney, Agent, or Firm*—Booth Udall, PLC

(57) ABSTRACT

Embodiments for lighted see-through displays include a plurality of light elements positioned thereon at select points arranged to convey information. The light elements may be selectively lit to provide fixed or moving information, or may even be programmed to change or even display like a marquee or even a television. Particular embodiments of the invention employ a lightweight, flexible substrate to support the light elements. Other embodiments employ one or more comparatively rigid substrates supporting rows of light elements. Particular applications for the lighted sign embodiments include display in vehicle windows such as police vehicle windows, construction and utility vehicle windows, and school bus and public transportation windows. Global Positioning System and radio signal receiver components allow for regional display of pertinent information in particular embodiments of the invention.

20 Claims, 6 Drawing Sheets

U.S. PATENT DOCUMENTS

| | | |
|---|---|---|
| 6,265,984 B1 | 7/2001 | Molinaroli |
| 6,309,087 B1 | 10/2001 | Huang |
| 6,318,868 B1 | 11/2001 | Larussa |
| 6,401,374 B1 | 6/2002 | Bahmad |
| 6,404,519 B1 | 6/2002 | McAbee |
| 6,424,269 B1 | 7/2002 | Pederson |
| 6,426,696 B1 | 7/2002 | Ortega |
| 6,446,375 B1 | 9/2002 | Davis |
| 6,547,410 B1 | 4/2003 | Pederson |
| 6,590,502 B1 | 7/2003 | Pederson |
| 6,661,427 B1 | 12/2003 | Mac Innis et al. |
| 6,880,276 B2 | 4/2005 | Strein et al. |
| 2005/0012682 A1 | 1/2005 | Jenson |

OTHER PUBLICATIONS www.pace-setter.com, "Led Traffic Alert and Message System", Nov. 18, 2003.

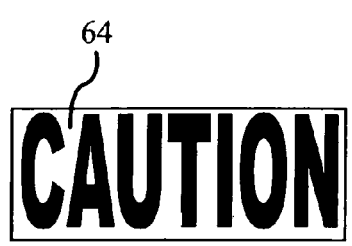
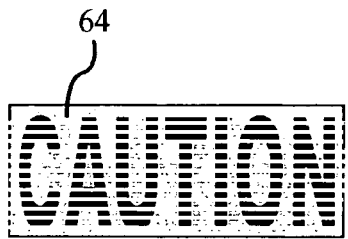
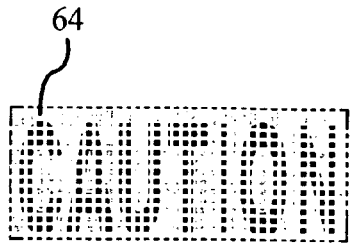
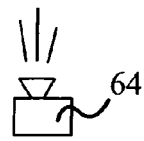
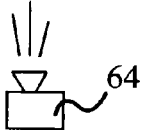
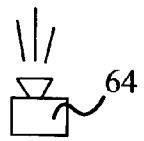
FIG. 9A　　　　　FIG. 9B　　　　　FIG. 9C
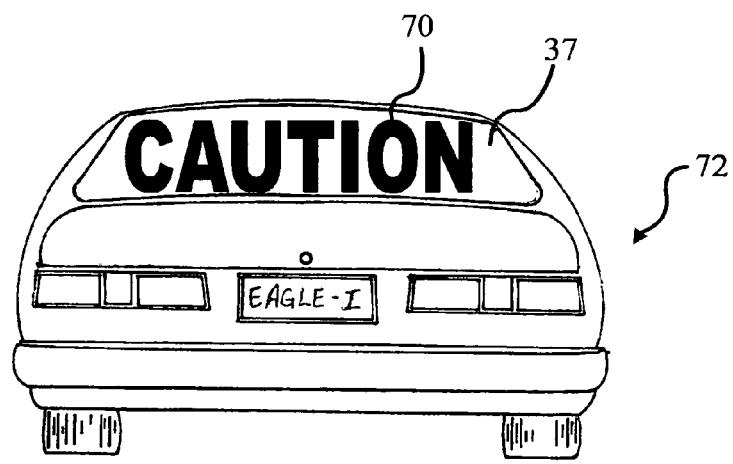
FIG. 10

SEE-THROUGH LIGHTED INFORMATION DISPLAY

CROSS REFERENCE TO RELATED APPLICATIONS

This application is a continuation of application Ser. No. 10/746,956, filed Dec. 26, 2003, now abandon, entitled "See-Through Lighted Information Display" to Booth et al., the disclosure of which is hereby incorporated herein by reference.

BACKGROUND OF THE INVENTION

1. Technical Field

This invention generally relates to lighted displays for vehicles, and more particularly to see-through outwardly facing, lighted displays for use in vehicle windows.

2. State of the Art

Lighted displays generally are well known in the art. Businesses use lighted "OPEN" and "CLOSED" signs and shaped neon bulbs for signs, companies regularly display their trademarks in lights to draw more attention, and lights displayed behind colored translucent signs are found in nearly every strip mall today. These examples of lighted displays typically include fixed information. In other words, the sign displays one message (or possibly two messages in the case of "OPEN" and "CLOSED" signs), and the lights can only display their given message or light the fixed image printed on the translucent sign board. Relating to lighted vehicle displays see, for example, U.S. Pat. Nos. 5,604,480 to Thompson and 5,648,756 to Zadok. Many of these signs are also contained within a housing and given a black or dark background to enhance the visibility of the message in the display.

Another example of a lighted information display is that of a marquee. Conventional marquees include an array of light emitting diodes (LEDs) housed in a box that contains all of the electronics for the array. The box and array of LEDs are coupled to a microcontroller that controls which LEDs are "on" and which are "off" at any given time to display particular information on the display, and in some cases the color and intensity of the lights emitted. These types of LED marquees housed in a box are known to be displayed on vehicles (see, for example, U.S. Pat. Nos. 6,590,502 B1 to Pederson (showing an LED display on a police light bar) and 4,868,542 to Thompson (showing an LED display at the bottom of a back car window)) and in store windows. If in a window, such marquees are typically displayed near an edge of the window so the marquee display box does not disrupt the view through the window. The marquee display box is given a dark background to enhance the visibility of the message in the display and hide the electronics contained within the marquee.

SUMMARY

The present invention relates to a lighted display that does not significantly disrupt the view of an observer through the display, but still is capable of displaying variable, readable information. In one particular embodiment of the invention, a plurality of light elements is included along an edge of a substrate and forms a narrow row of light elements, each element being controllable independent of the other elements. A plurality of rows of light elements are spaced over a display area leaving gaps between the rows. One or more ends of each row are electronically coupled to a signal bus that is coupled to a microcontroller to control each light element and selectively display variable information on the rows of light elements. The rows and end control busses are attached to a rigid support, such as a display frame, a portion of a vehicle, or a window, to maintain their respective spatial relations. Because there are gaps between the rows, in particular embodiments the gaps are wider than the rows themselves, and no backing is placed to cover the back of the display area, the display is see-through.

In another particular embodiment of the invention, a flexible, lightweight substrate, such as a net or a transparent film, is used to support a plurality of light elements that are independently controllable for displaying information. Light elements are distributed throughout the display area of the net and signal conductors may either be woven through the net, coupled to the net along the net rows and columns, or remote transmitters may be used.

Particular application is found for the lighted displays in public safety vehicles, such as police cars and ambulances, utility vehicles, such as utility trucks and construction vehicles, school buses, and other public transportation vehicles such as buses and taxis. Additional application is found for the lighted displays in windows where it is desirable to display a message viewable from a distance without significantly impeding the view through the window. Embodiments of the present invention also provide utility in that when used in the open, they create relatively little wind resistance and, therefore, are useful for vehicles, such as utility vehicles, that have need to display a message, yet also have need to move quickly from one site to another.

Particular aspects of the invention relate to conveying information to others through the sign. The information may include any message desirable to display to others. It is particularly contemplated, however, that in specific applications of the invention the information will include warnings of traffic conditions, directions to drivers, advertisements, amber alert warnings, calls for help, notices, and other information.

The foregoing and other features and advantages of the present invention will be apparent from the following more detailed description of the particular embodiments of the invention, as illustrated in the accompanying drawings.

BRIEF DESCRIPTION OF THE DRAWINGS

FIG. 9a is a simplified diagram of a see-through lighted display according to a first projected light display embodiment of the present invention;

FIG. 9b is simplified diagram of a see-through lighted display according to a second projected light display embodiment of the present invention; and FIG. 9c is simplified diagram of a see-through lighted display according to a third projected light display embodiment of the present invention; and FIG. 10 is an illustration of information displayed on a see-through lighted display in a rear window of a vehicle according to an embodiment of the present invention.

DETAILED DESCRIPTION

Figure 1:
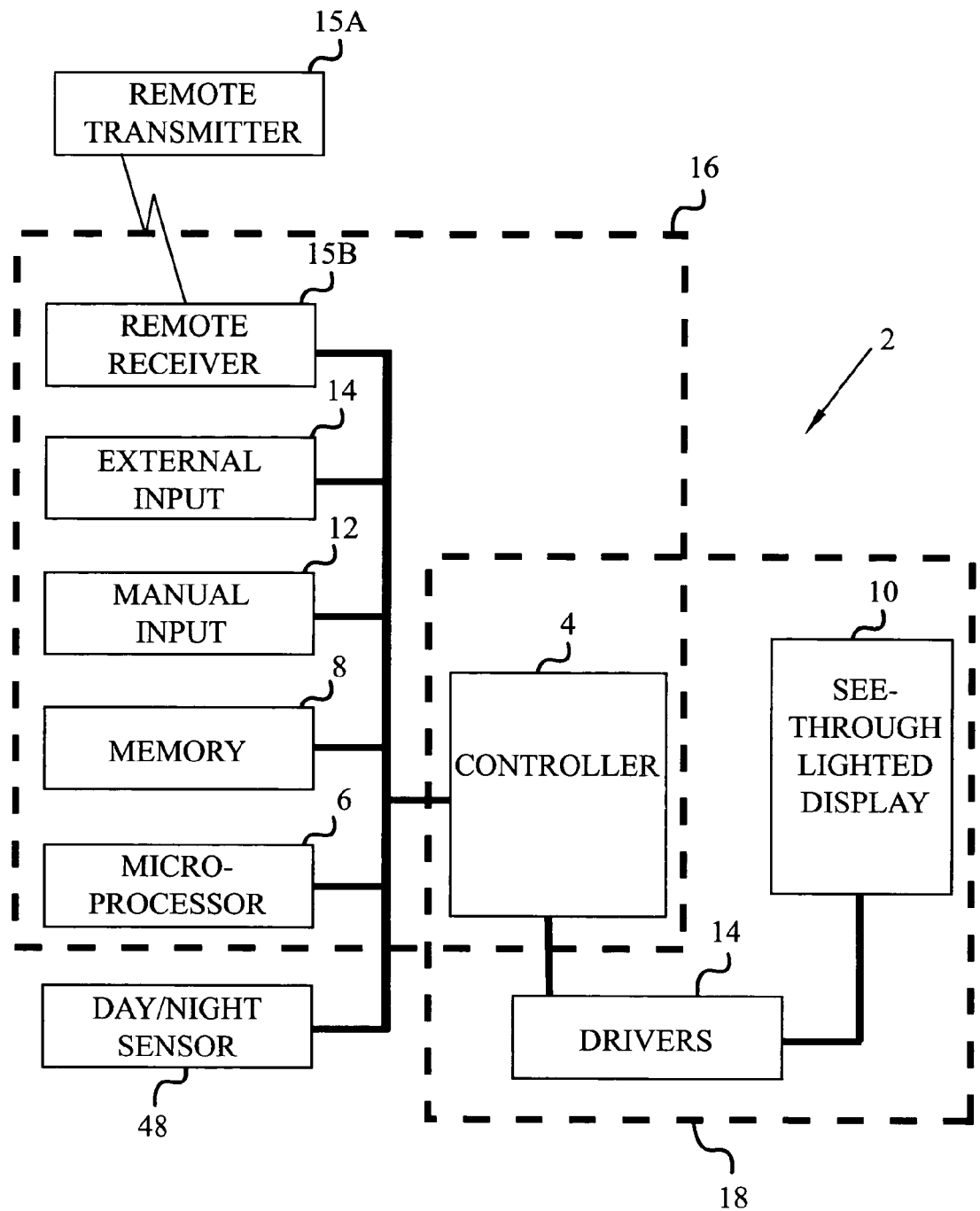
FIG. 1 is a general block circuit diagram of a see-through lighted display system for use with particular embodiments of the present invention.

As discussed above, embodiments of the present invention relate to a see-through information display. FIG. 1 includes a general block circuit diagram of a see-through lighted display system 2. The example system shown in FIG. 1 includes a controller 4 which includes, or is coupled to, a microprocessor 6 having memory 8. General lighted signs and the necessary components and programming for their controllers are well known in the art and are expected to be sufficient for controlling the various see-through lighted displays 10 of the present invention. Examples of controllers and circuitry for some conventional light emitting diode (LED) displays for vehicles are shown and described in U.S. Pat. Nos. 4,868,542 to Thompson (issued Sep. 19, 1989), 4,928,084 to Reiser (issued May 22, 1990), 4,929,936 to Friedman et al. (issued May 29, 1990), 5,715,619 to Polisois (issued Feb. 10, 1998) and 6,590,502 B1 to Pederson (issued Jul. 8, 2003), the disclosures of which are hereby incorporated herein by reference for their disclosures of the conventional components and circuitry used to make lighted displays and the methods of making them.

A controller is also needed to cause the information to appear through the light elements working in combination. As used herein "information" conveyed through the light elements is not merely a Morris Code-type of information with a single light or group of lights flashing on and off. Rather the "information" conveyed involves a plurality of light elements working in combination to convey an idea such as by generating a visual image, words, characters, or the like. The controller may include more complex controllers for independently controlling the amplitude, color, and status of each light element on the substrate. Although many of the embodiments shown and described herein involve complex applications of this new technology, those of ordinary skill in the art will understand how to make and use the embodiments of the present invention, and apply the concepts to other embodiments of the invention, from the disclosure provided herein.

The controller 4 includes at least one input for interaction with the controller 4. The input may be a manual input 12, such as simple as a button or switch, or more complicated manual inputs such as selection buttons (FIG. 2a) or a keypad or alphanumeric keyboard (FIG. 2b). Additionally, other external inputs 13 may be included such as a plug for a laptop, a writing tablet or other computer, through which commands may be directed to the controller 4, programming of the controller 4 may be amended or updated, and particular informational display information may be loaded into the memory 8 for the see-through lighted display. Other external inputs such as a daytime/nighttime light sensor 48, or a wireless remote receiver 15B and transmitter 15A (collectively wireless input 15) may also be used.

Depending upon the type of see-through display 10 used and the type of display elements used, drivers 14 may be needed to drive the display elements. The drivers 14 may be included in the controller portion 16 of the system 2, or may be included in the display portion 18 of the system 2 as necessary for a particular application. Those of ordinary skill in the art of lighted sign displays will readily be able to determine the needed driver components and most appropriate driver location for each particular application from the disclosure provided herein. In many cases, it may not matter whether the drivers 14 are included on the display 10 or on the controller 4. The controller portion 16, for example, may comprise a microprocessor chip having the microprocessor 6, controller 4, memory 8 and drivers 14 on board the chip.

Figure 2A:
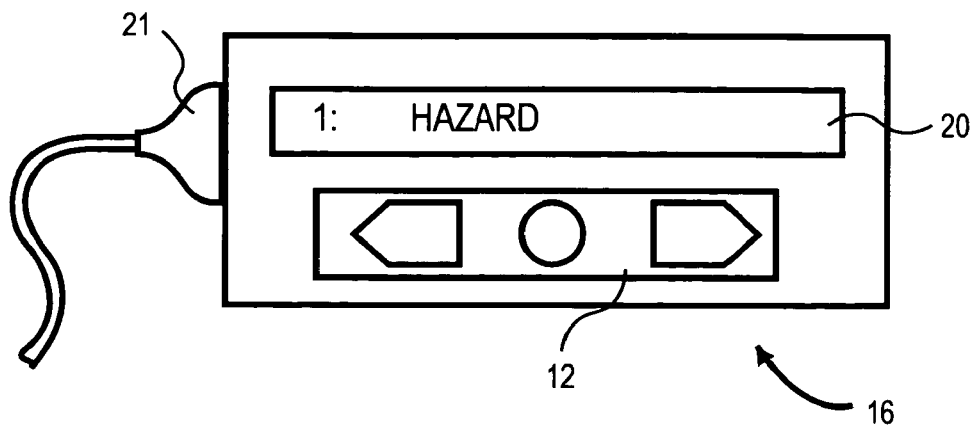
FIG. 2a is a faceplate of a first, simple embodiment of a controller for use with particular embodiments of the present invention.
Figure 2B:
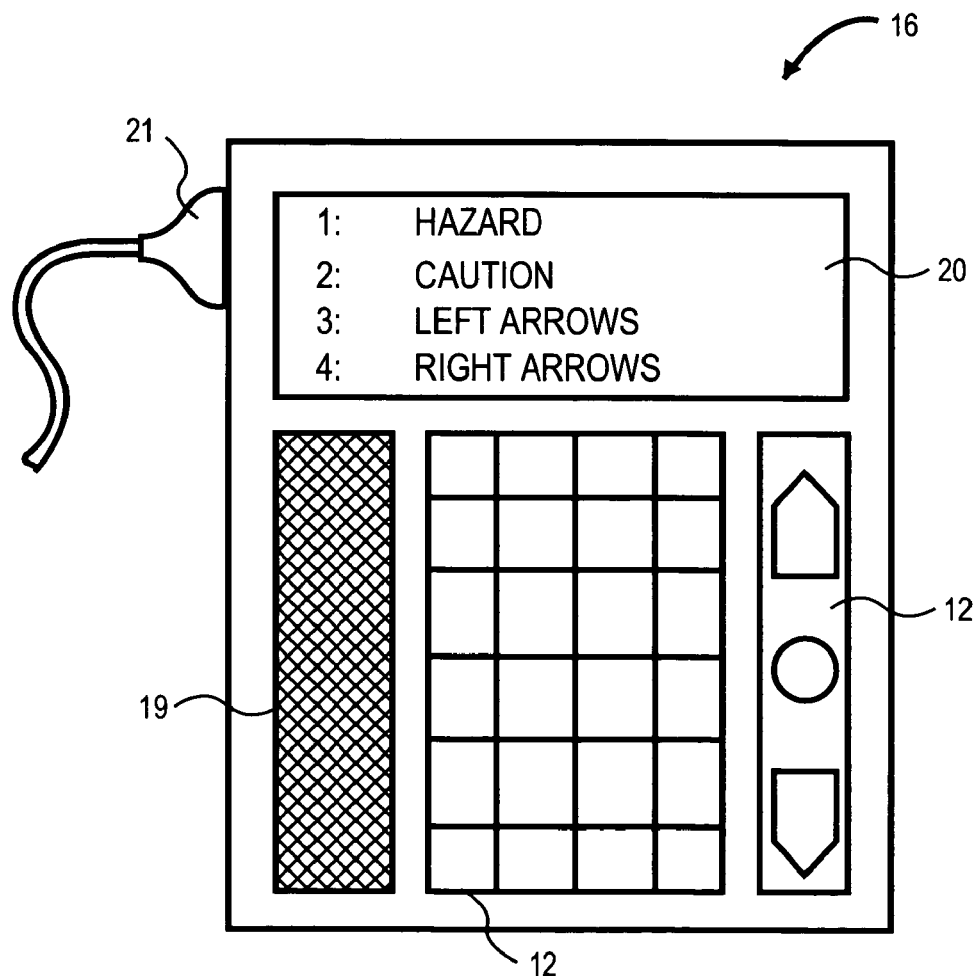
FIG. 2b is a faceplate of a second, more complex embodiment of a controller for use with particular embodiments of the present invention.

In addition to providing examples of a manual input 12, FIGS. 2a and 2b provide examples of a controller display 20 that may be included on the face of the controller portion 16 housing. The controller display 20 may be any display known in the art including, but not limited to, a touch screen, a LED display, a plasma display, an LCD display, and the like. Accordingly, for a touch screen display 20, the mechanical manual controls 12 may not be needed and it is contemplated that the manual controls 12 may be programmed through the display controller software to show on and receive input through the touch screen controller display 20. The controller portion 16 and manual controls 12 may be mounted, for example, to the dashboard of the vehicle. An external cord 21 may be used or, wireless communication may be used. Audible alerts to the operator may optionally be provided through a speaker 19 or may provide voice commands to the controller through a microphone 19. Alternatively, a laptop computer may function as the controller if programmed with appropriate software.

Figure 3:
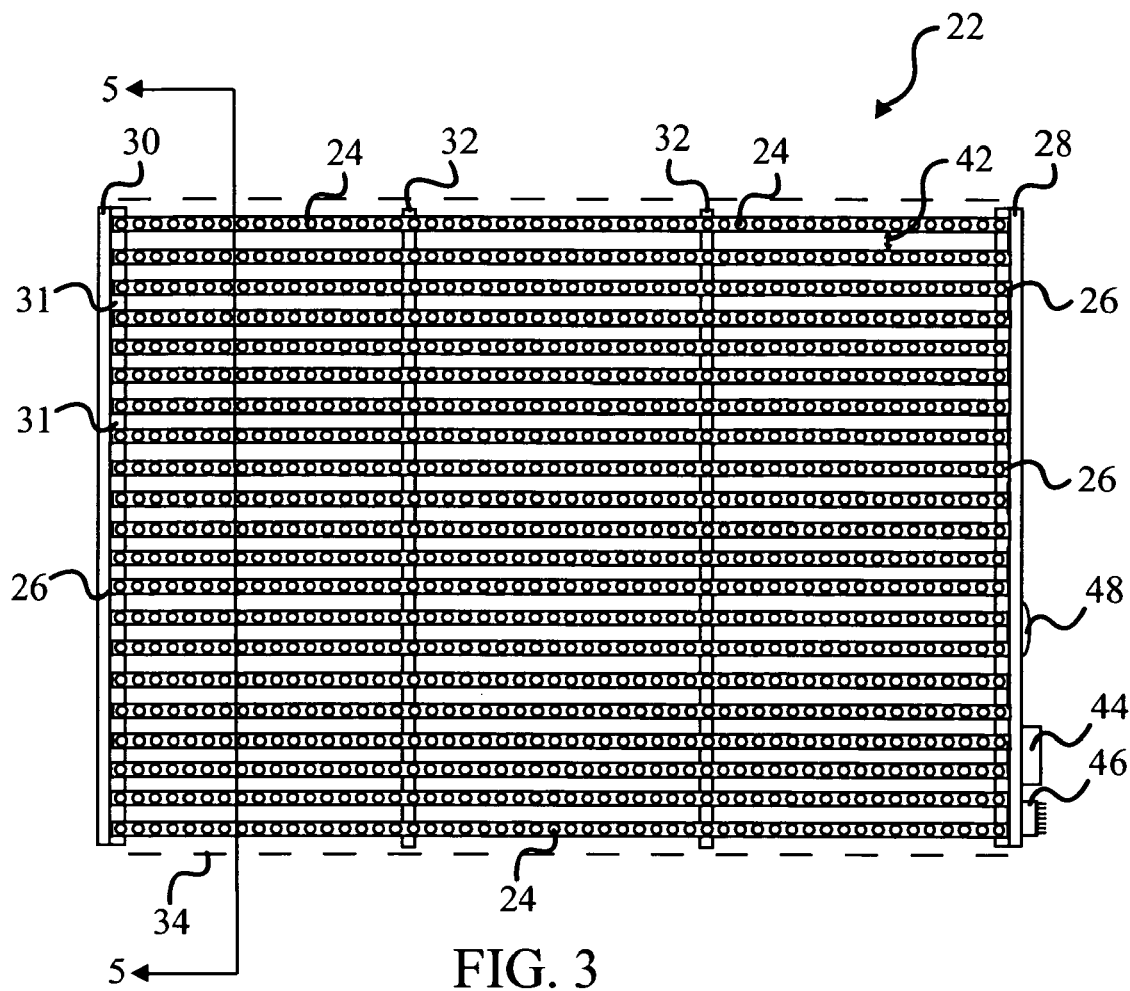
FIG. 3 is an example of a see-through lighted display according to a first display embodiment of the present invention.

FIG. 3 illustrates a first embodiment of a see-through lighted display 22 for use with the present invention. FIG. 3 includes a plurality of light elements 24 spaced horizontally along a plurality of light element rows 26. A light element is any material that can be made to emit a controllable light (at least ON and OFF). Examples of light elements include a light emitting diode (LED), a light bulb, a fiber optic tip or edge, glass or plastic segments, a laser element, and any other light element capable of emitting a controllable light. Light elements may be colored due to the frequency of light emitted by the light element, due to a medium through which the light passes to filter or color the light, such as a gel or other colored medium, or due to any other method known to those of ordinary skill in the art of producing light which appears colored to an observer.

For an LED, laser element, light bulb or other electrically powered or controlled light element, electrical wires or other conductive material or power source to the light element is required. For a fiber optic tip or edge, or other light-conducting medium, a light-conducting line, such as a fiber optic filament, is required to conduct the light to the point where the light is to emit. Combinations of both electrically powered and optically conductive light elements may also be used. For example, an LED or laser may light a portion of a fiber optic filament to increase the viewing area of the light source. Other magnification, amplification, reflective, light splitting, or other components may be included with or as part of the light element to enhance or adjust viewing for observers, to boost or direct light, or to increase the viewing area size or shape of a light element.

The light element rows 26 are each coupled on at least one end to a first signal bus 28. The opposing side of each light element row 26 may be coupled to a second signal bus 30, or merely to a support clamp 31 if the power or light source for the light elements comes through the first signal bus 28. One or more optional support braces 32 may be included to maintain the spacing between the respective light element rows 26 and reduce the likelihood that the light element rows 26 will sag over time. The see-through lighted display 22 includes a display area 34 over which the light elements are distributed. In the embodiment shown in FIG. 3, the light elements 24 are substantially uniformly distributed throughout substantially all of the display area 34. It is contemplated, however, that for particular embodiments of the invention where the messages to be displayed by a display 22 are limited, that there may be coordinates within the display area 34 at which light elements 24 are not needed and an uneven distribution may be desirable to reduce the number of unnecessary light elements 24 used. Even in these cases, however, the light elements 24 are substantially uniformly distributed throughout a majority of the display area 34.

The specific embodiment shown in FIG. 3 may be adapted for use in the rear view window of a Crown Victoria Cruiser made by Ford Company. To do so, the light element rows 26 are coupled to the signal buses 28 and 30 at an angle such that when the signal buses 28 and 30 are coupled to the rear window of the vehicle, the light elements 24 will shine out the back window of the vehicle in an orientation substantially parallel to the ground. In this way, observers behind the vehicle will obtain an optimal view of the light elements 24 shining from the see-through lighted display 22. It is also contemplated that in particular embodiments of the lighted display 22, the light element rows 26 and signal buses 28 and 30 may be mounted substantially horizontally, either to a substantially horizontal window, or between the surfaces near the window to hold the display 22 in place. It is anticipated that in some embodiments of the invention, such as those for which it is known which make and model of vehicle the display will be mounted, the light element rows 26 will fixedly, but removably, mount to the signal buses 28 and 30. With removable light element rows 26, if a light element needs replacing, the row 26 may be easily unmounted from the clamps 31 and replaced with a new row 26 while the faulty row is repaired or light element replaced.

In other embodiments, however, where it is not known what angle the rear window of the vehicle is mounted, it is anticipated that a range of pivoting motion will be made available for each light element row 26 through the signal buses 28 and 30. In this way, an installer can pivot the installed light element row 26 to an appropriate angle with respect to the rear window so that the light elements 24 shine substantially straight behind the vehicle. The pivoting range may optionally be locked after it has been set, for example, by turning a set screw or latching the moving part in place. Pivoting and locking electronic connectors are well known in the art and those of ordinary skill in the art will readily be able to fashion an appropriate pivoting mount from the disclosure provided herein for the particular light element type chosen for a particular design.

It should be understood that there will be a greater likelihood that if the lighted display is mounted to the vehicle such that it is spaced from the back window surface, light from the light elements 24 may partially reflect off of the back window toward the driver. This may cause some distraction to the driver, particularly during night driving. For the specific embodiment of the invention shown in FIGS. 3-5, a protective casing 36 is placed around each light element row to electrically insulate and/or physically protect the elements and conductors passing therethrough, and to shield the light from reflecting back into the cab of the vehicle to reduce the likelihood of light reflecting back toward the driver. As shown in FIG. 5, the light element rows 26 and protective casing 36 may be mounted to abut, or come very close to, the rear window 37 of the vehicle. A layer of adhesive, such as a liquid adhesive or an adhesive tape or foam, may also be included between the casing and the window, but adhesive is not required. The thin protective casing 36 may be made of any material that will shield the light from re-entering the cab of the vehicle and protect the particular light elements used and may include, but is not limited to, rubber or plastic. Black or gray hard plastic protective casing configured as a channel is specifically contemplated, though other shapes and/or colors are also suitable.

The specific example illustrated in FIG. 3 includes light emitting diodes ("LED") 24 as the light elements. LEDs come in a variety of colors (including single, dual, and multiple color), sizes (from 3 mm diameter to 10 mm diameter), view angles (typically between 3-180 degrees) and brightness (from 1000 mcd ("millicandelas") to 20,000 mcd). It is contemplated that in simple embodiments of the invention, single-color LEDs may be used, such as red or yellow, to convey the information. In more complex embodiments, two- or three-color LEDs may be used. Three-color LEDs (magenta, amber and cyan) can generate most every color. Instead of two- or three-color LEDs, two or more separate LEDs, each of a different color or one or more of different colors, may be used together to serve the same function and operate as a display pixel. For embodiments where the display will need to operate during both the day and at night, three-color LEDs need to be carefully selected to ensure sufficient brightness for daytime viewing. Many three-color LEDs are not sufficiently bright for daytime viewing at even a moderate distance. A wider view angle also affects the brightness of the LED. For use on the rear of a vehicle, it is expected that a total view angle of not less than 5 degrees, and not more than 120 degrees will be used, with an optimal range between approximately 5-90 degrees total viewing angle, though each particular application will have its own dictated variances. LEDTronics, Inc. of Torrance, Calif., USA, sells a wide variety of LEDs useful for embodiments of the present invention. The expected ranges allow for sufficient brightness, and allow for a large viewing range behind the vehicle, and yet do not waste needed brightness by attempting to display information to drivers very close but to the side of the display vehicle. Another benefit of LED lights is that they can be strobed or pulsed on and off quickly to further attract the possibly distracted attention of observers.

It will be understood by those of ordinary skill in the art that when it is said that the light elements are individually controlled, this is intended to contemplate that a plurality of light elements within a particular region may be controlled together so as to create a single display pixel, each of the individually controlled display pixels being substantially the same size and shape. Thus, a display pixel is formed of one or more light elements. At various places throughout this disclosure, the term pixel may be used interchangeably with light element. It should be clear, however, that this is not intended to limit those cases to only a single light element in the display pixel. Rather, in many cases, only a single light element is shown and described because it is the simplest form of a pixel. More complex pixels with multiple light elements are certainly contemplated by this disclosure. Generally, seven rows of pixels are used to generate alphanumeric characters. In practice, therefore, twenty-one rows of pixels may be used to generate three rows of alphanumeric characters. Alternatively, multiple rows may be operated together to make larger characters. For example, all 21 rows may be used to form a single alphanumeric row of characters three-times higher than if only seven rows are used. The number of rows used for a particular message or image being displayed is a matter of programming the pixels to display appropriately. Those of ordinary skill in the art of lighted display programming will readily be able to program the displays of the present invention just as other lighted displays of similar dimension are programmed.

Figure 4:
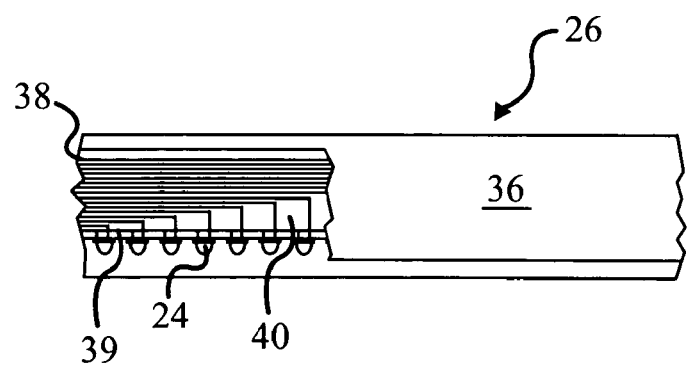
FIG. 4 is a partial cut-away top view of a light row substrate of the see-through lighted display of FIG. 3.
Figure 5A:
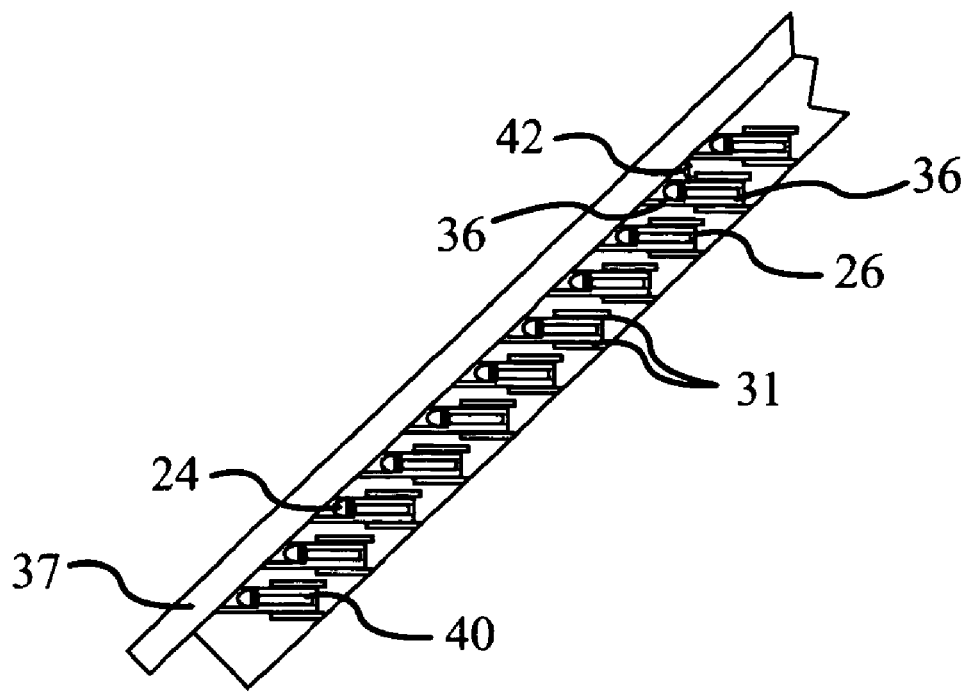
FIG. 5a is a cross-sectional view of the see-through lighted display of FIG. 3 taken along line 5-5 and showing the display mounted on a window.
Figure 5B:
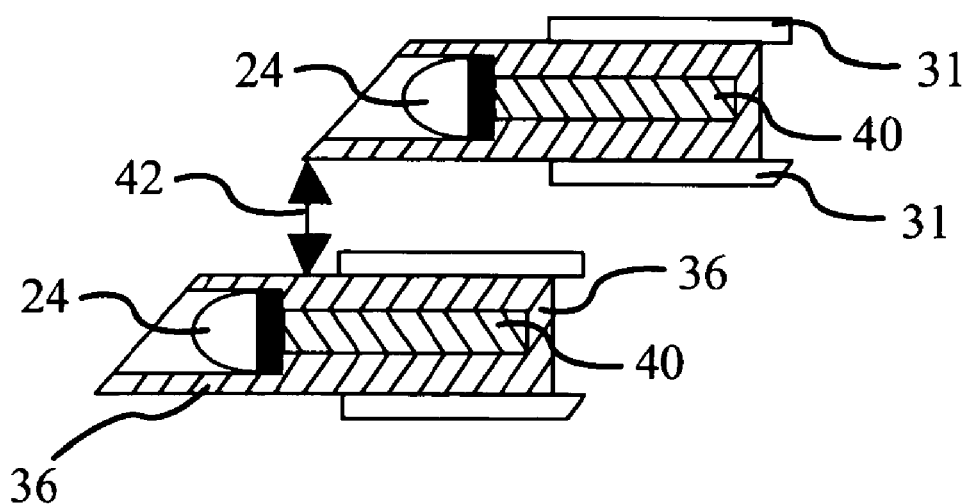
FIG. 5b is a close-up view of two light elements of the see-through lighted display of FIG. 5a illustrating the see-through space between the light elements.

FIG. 4 illustrates a top view of a light element row 26 of FIG. 3 with its casing 36 partially removed to reveal the signal traces 38 and power trace 39, and a printed circuit board 40 as the substrate for the LEDs 24 of this particular embodiment. The signal traces 38 extend to a point near the end of the light element row 26 where they couple to corresponding signal conductors on the signal bus 28 or 30. By mounting the LEDs 24 on an edge of a substrate 40, such as a printed circuit board, the profile of the light element row 26 is narrow, yet signals and power can be provided to the LEDs 24. The casing 36 extends just beyond the ends of the LEDs 24 to reduce the possible distraction of the lights to the driver. The casing 36 extending beyond the ends of the LEDs 24 also acts as a shield against the light reflecting from the back window in to the cab of the vehicle when the casing 36 is mounted against the surface of the vehicle window 37 as shown in FIGS. 5*a* and 5*b*. It should be noted that, like the other FIGs. provided herein, FIGS. 3-5*b* are not to scale but are provided to relay an understanding of the invention.

For the specific embodiment shown in FIG. 3, the light element rows 26 are spaced at approximately one-inch intervals. Using a 3 mm dual color LED with a thin plastic protective casing 36 results in an opening 42 between the light element rows 26 of approximately ¾-inch. Thus, the display area 34 is approximately 75% see-through, or unobstructed, for this example. Use of a 5 mm LED with a thin protective casing 36 results in an opening 42 between the rows that is approximately ⅔-inch, and a display area that is approximately 67% see-through. It is expected that at some point in narrowing the gaps 42 between the rows 26 of light elements, the gaps 42 will become too small to effectively see the detail of objects beyond the display. It has been determined that a see-through percentage of at least approximately 25% or more of the display area 34 is sufficient for viewing, though smaller percentages would still be considered see-through to an extent. At approximately 50% or more of the display area 34 being see-through, objects beyond the display are much more visible and distinguishable. It is expected that a display area less than approximately 50% would be too small for most driving conditions where the driver is most comfortable using the rear view mirror to warn the driver of conditions behind the vehicle. In the example of FIG. 3 using the 3 mm LEDs, an approximately 75% see-through display area was achieved. In other embodiments, such as that shown in FIG. 6 using a net, as high as 90% see-through may be obtained. It is expected that if a transparent substrate, such as a plastic film, were used, even greater see-through area percentages may be achieved.

As used herein, "see-through" means that an observer can see beyond the display to objects on the other side of the display through viewable openings between the light elements and supporting materials. "See-through" does not require a physical opening, just a viewable opening through which an observer can see. Transparent coverings and other components may be considered "see-through" portions of the display for this purpose. Wider spacing of the light element rows 26 will obviously increase the see-through percentage of the display, but wider light element row 26 spacing may cause the information on the sign to look more disjointed to observers. To create a substantially even grid, the light elements 24 on the light element rows 26 for this example are spaced at approximately 1 inch intervals. For a Crown Victoria Cruiser back window, approximately 21 light element rows 26 will be used, each row being approximately 41 inches long resulting in a view area 34 of approximately 800 square inches.

It is further contemplated that multiple LEDs of multiple colors could be lined adjacent each other such that each color repeats each 1 inch interval. An ASIC or other controller or driver chip 44 may be included on the display 22 as needed. The display 22 will also include an external connection 46 to which an external controller and/or a power supply may be coupled. A daylight sensor 48 may also be included to assist the controller in determining the amount of ambient light so that the light elements may be dimmed appropriately for nighttime use. This practice is common with LED displays. It will be clear to those of ordinary skill in the art that embodiments of the present invention may include vertical rows rather than horizontal rows using the same principles discussed herein, leaving gaps between the rows. It will also be clear to those of ordinary skill in the art that the lighted display elements 24 may be other light sources or conductors such as fiber optics. Because of the durability and long life of LEDs, the familiarity of programmers with programming LED lighted sign displays, and the brightness of the LEDs for use in daytime or nighttime use, however, LEDs work very well for applications such as the see-through lighted display 22 of FIGS. 3-5.

Figure 6:
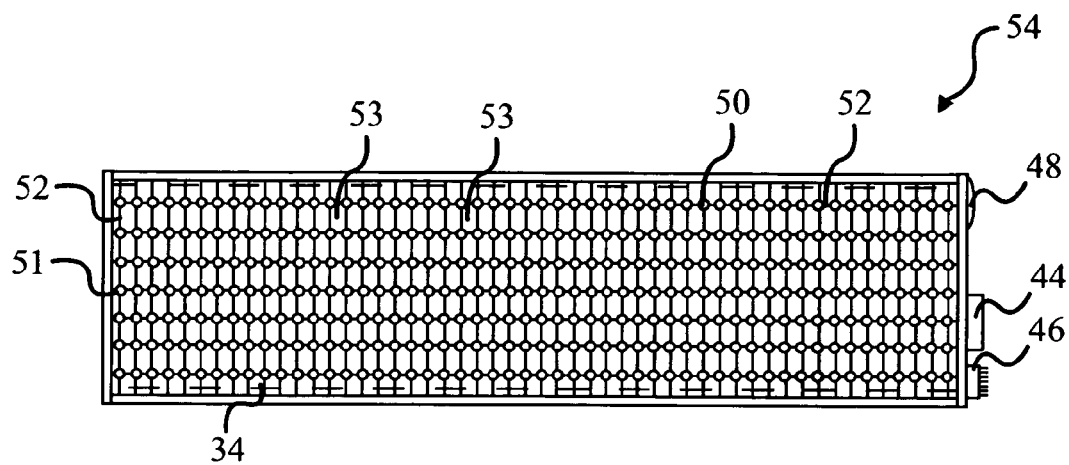
FIG. 6 is an example of a see-through lighted display according to a second display embodiment of the present invention.

FIG. 6 illustrates a second embodiment of a light element display configured according to the present invention. In this second embodiment, the light elements 50 are supported on a substrate grid 52 rather than in the somewhat isolated rows as was shown in FIG. 3. In this arrangement, the light element power and other signals may be directed to the light elements 50 either along the horizontal, the vertical or both depending upon how the designer lays out the display and signal conductors.

Embodiments of the substrate include a lightweight, flexible material such as plastic, nylon, metal or other material. Both mesh, or net, and film embodiments are contemplated. The substrates contemplated include all shapes, sizes and dimensions. For the net, mesh densities of all shapes and sizes are anticipated depending upon the resolution desired for a particular display and the size of the window and viewing area for a particular design. For purposes of the present disclosure, a "net" is a substrate formed of a material that includes more open area than closed area so that the net is see-through. Net mesh and net outline shapes such as square, rectangle, round, hexagon, octagon, triangle, and any other shapes into which a mesh or net outline may be fashioned are also contemplated. A net is formed of horizontal and vertical net elements. The net, by virtue of being a net, also includes openings between the horizontal and vertical net elements, and junctions where the horizontal and vertical net elements meet.

A net may be made of any material that can be formed into a mesh. Conventional mesh materials include weavable nylon, cotton, plastic, rubber or other material, hard plastic, polyvinylchloride (PVC), polyurethane, or other moldable or formable material, aluminum, steel, wire or other weavable or formable metal material. Any other material that is conventionally formed or may be formed into a mesh may be used. One advantage of using a net support substrate in embodiments of the present invention is that sufficient support and attachment points are provided to which light elements may be secured, yet the substrate is still lightweight and is still, for the most part, see-through.

In a particular embodiment, both the horizontal and vertical substrate supports 52 are formed of electrically conductive material having an outer insulation. The light elements 50 are coupled to or supported by both the horizontal and vertical substrate supports 52 as well as to a switching element and a capacitor, much the same way a computer monitor's pixels work. See U.S. Pat. No. 6,570,553 B2 to Hashimoto et al (filed Dec. 18, 2000), titled "Display and its Driving Method", the disclosure of which is hereby incorporated herein by reference, for an example of display and pixel drivers. By supplying information to the display through appropriately configured drivers and controllers in the same way information is provided to a computer display, but with much lower resolution, the lighted display may be made to display selected information and graphics. See U.S. Pat. No. 6,661,427 B1 to MacInnis et al. (filed Nov. 9, 1999), titled "Graphics Display System with Video Scaler," the disclosure of which is hereby incorporated herein by reference, for an example of how to scale graphics to fit lower resolution displays. Conductive wires may be run to the light elements, and fiber optics may be woven in to the elements or otherwise routed to the appropriate array locations.

Light elements 50 are positioned only at junctions 51 of the net of FIG. 6. Provided the conductors for the light elements are restricted so that they do not cross through an opening 53, positioning the light elements 50 only at junctions 51 of the net leaves more of the openings 53 open within the view area 34 so that the driver can more freely see through the net. Because the possibilities for conductors and controllers for various light elements are so varied, the controllers and conductors will not be shown for each of the specific display designs. It should be understood, however, that controllers and, except in particular embodiments for wireless transmitting and receiving of signals herein, some form of conductor, light or electricity, would be used.

Regardless of the particular display style, the array substrate 52 may be made rigid to support the display, or may be made lightweight and/or flexible. If made flexible, the substrate will likely need a supportive frame, or at least attachment locations within the vehicle to support the display 54. A data and/or a power plug 46 should also be included for the display, unless wireless signal transfer is used and the display has its own power source such as a battery or other power supply. It is expected that in many cases, the display's power will be supplied by the vehicle's battery.

As an alternative to a net, a transparent film could also be used as a substrate for LEDs. Metlon India PVT. Ltd. of Delhi, India, and Spectratek Technologies, Inc. of Los Angeles, Calif., USA, provide a variety of films suitable for various embodiments of the present invention. Small circuit traces may be formed on the substrate surface, or wires may be otherwise adhered thereto, and small LEDs may be placed at appropriate positions throughout the display area using, for example, conventional pick-and-place manufacturing techniques. In such cases, however, the circuit trace layout should be designed to maximize the open regions between the circuit traces to enhance the see-through nature of the display. A grid pattern such as that shown in FIG. 6 could be used and a similar plug 46 could be adapted to interface between signal buses at the edge of the display and the controller.

Figure 7:
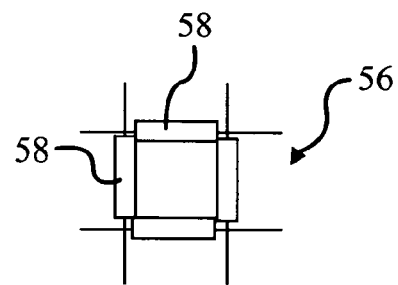
FIG. 7 is an example of a first alternative light element for a see-through lighted display according to a third display embodiment of the present invention.
Figure 8:
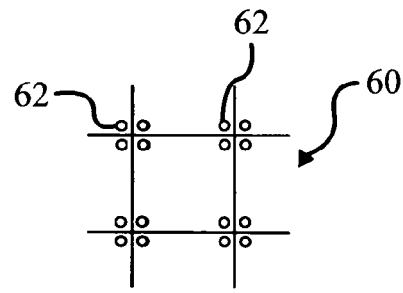
FIG. 8 is an example of a second alternative light element for a see-through lighted display according to a fourth display embodiment of the present invention.

FIG. 7 illustrates another example of a pixel 56 comprising a plurality of fiber optic sections 56 lit by other light sources such as an LED, a fiber optic filament or other light source. The combination of the four fiber optic sections 58 surrounding the square of the grid will allow the square to be used as a pixel for the display, to be operated in most cases as a single pixel 56. FIG. 8*a* illustrates yet another example of a pixel 60 using a combination of light sources 62 that also may include, LEDs or fiber optic filaments, or any other controllable light source. Other plastic or glass sections may be used in place of fiber optic sections 56.

FIGS. 9*a-c* illustrate embodiments of the invention where reflective surfaces are 64 positioned throughout the display area and light is projected onto the reflective surfaces 64 from a projector 66. For any of these examples, the reflective surfaces may be one-way reflective surfaces that when they are installed on the rear window of a vehicle are transparent from the inside of the vehicle and reflective from the outside of the vehicle. Alternatively, for the examples provided in FIGS. 9*b* and 9*c*, where the reflective material 64 does not fill the entire display area, the reflective surfaces could be made non-see-through from the inside and still provide the driver with a view through the rear window of the vehicle. A contemplated example of non-see-through reflective material is the white textured material conventionally used as screens for movie projectors. One concern with reflective-type materials on the rear window of a vehicle, however, is that the sunlight or other light source may reflect light into the eyes of surrounding vehicles and distract their driving. Reflective films are available that reflect only particular wavelengths of light. Selection of an appropriate light-projecting source 66 and reflective film will reduce the risk of creating a hazard. Metlon India PVT. Ltd. of Delhi, India, and Spectratek Technologies, Inc. of Los Angeles, Calif., USA, each sell a number of film varieties that will appropriately reflect light projected onto it. Metlon India's holographic films also provide the option of having a see-through fixed holographic message displayed (such as solid red in the back window when braking) when a selected light is shined onto the film.

The light projector 66 may be a simple incandescent bulb with a film or gel in front of it that includes a message, or may be a more complicated light source such as a laser. The light projector 66 may be mounted in any location to enable projection of the message onto the back window, such as on the trunk, above the window, or on either side of the window. Fresnel lenses or other lenses may also be used to improve image clarity and projection of the light in specific embodiments.

FIG. 10 is a rear view of a vehicle employing a see-through display configured according to an embodiment of the present invention. The substrate and individual light elements have not been specifically shown in FIG. 10 because the scale of the vehicle window is so small that meaningful illustration is impractical. Instead, the message is displayed on the display 70 in the window 37 of the vehicle 72.

Specific Applications

It is anticipated that embodiments of the present invention will be used to convey information to those in vehicles behind the vehicle with the see-through display when the display is mounted in the back window. The information that could be displayed is significantly varied but includes, for example and without limitation, advertising, announcements, good will, decorative designs, traffic directions and commands, brake lights, hazard lights, speed limits and actual speed indicators, as well as any other information that can be conveyed through a display.

The following are a few of the specific applications already contemplated for embodiments of the present invention as they relate to vehicles. Police cars and other public safety vehicles, construction vehicles and utility trucks, school buses, public transportation such as taxis and buses, general public usage for personal, business, fleet and government vehicles.

Law Enforcement Vehicles

For law enforcement vehicles, a see-through display mounted in the rear window of the vehicle will provide many advantages. In recent years, many law enforcement officers have been seriously injured or killed through road-side accidents while the officer was assisting a stranded motorist on the side of the road, stopped to issue a traffic ticket, directing traffic, or doing some other activity in the role of a law enforcement officer. Despite flashing lights on the top of the vehicle, and even flashing tail lights, many motorists apparently are not seeing the law enforcement vehicle at the side of the road. Displays according to embodiments of the present invention may be configured to fill virtually the entire back window of the vehicle and flash very brightly. It will be much easier for a motorist to see a large flashing indicator than it will for the motorist to see the current small flashing indicators. With the back window flashing red, blue, yellow or white, or combinations of them, a motorist will have much more opportunity to be alerted to the officer at the side of the road, or at least have a much better chance to see the vehicle.

The same is true for merely attaching the display lights to be triggered red by the officer pressing on the brake pedal. The lights shining brighter based upon the intensity of the pedal press. A full back window lighting red is much more likely to be seen by a motorist than the small brake lights currently used. One significant advantage of embodiments of the present invention is that although the display may virtually fill the rear window of the vehicle, the driver can still see the vehicles behind the car through the display.

In addition to merely flashing the entire window a particular color or series of colors, specific messages may be provided in the law enforcement vehicle's back window that may help the officer in his or her job. For example, a messages like "SLOW DOWN", "SPEED LIMIT 55 YOUR SPEED 70", "<<<<<MOVE LEFT", "CAUTION", "STOP", "ACCIDENT AHEAD", "DETOUR", and many other similar messages, or even just flashing lights, would be very useful to officers not only because these are commands frequently given by officers, but also because these messages are often messages that officers need to display on lighted signs. Typically, the officer needs to request a lighted sign in advance and have it moved to the place it will stand until used by the officer and then later removed. Many times, whether due to cost or time constraints, officers are not able to order the lighted signs and are forced to give the indications in person. Many of these common messages may be pre-programmed into the controller for the display for selection by the officer and/or custom messages may be input by the officer and stored in memory for future use.

One or more of the external inputs 14 (FIG. 1) for the controller may be coupled to one or more of the speedometer and the neutral switch for the vehicle. With this connection with the vehicle, the controller can regulate which, if any, messages are being displayed when the vehicle is moving. It may be undesirable, for example, to have the officer displaying a "STOP" message on the back of the vehicle when the officer is traveling on the freeway, or a "MOVE LEFT" message when the officer is driving in the left lane of a road. By connecting the controller to outputs from the vehicle, safety measures can be implemented against errors by the officer forgetting to turn off the display. Additionally, the controller may be provided with audible and visual warnings to remind the officer that the display has not been turned off, or at a minimum to remind the officer of the message being displayed. Many law enforcement vehicles already include laptop computers within the vehicle. Such a computer, configured with appropriate software, would be sufficient to act as a controller for embodiments of the present invention and already includes both visual and audible indicators.

Another optional external input to the controller 4 (FIG. 1) is a wireless remote input 15. To assist the officer in directing traffic from a safe distance or at least to allow the officer to change the message on the display from a distance away from the vehicle, a remote control for the display may be provided. If, for example, a traffic light has gone out, rather than requiring the officer to stand in the middle of the street to direct traffic, the officer may be able to orient the vehicle in the street and change the display message between "STOP" and "GO" or "STOP" and "PROCEED WITH CAUTION" through the remote controller.

Another application unique to the law enforcement industry relates to the nation-wide AMBER Alert system instituted in the Fall of 2001 by the National Center for Missing & Exploited Children (NCMEC). Currently, when a child is abducted and it is determined to be in imminent danger, AMBER alerts are sent out. Unfortunately, however, many civilians do not know that a child is missing until watching the nightly news. In one particular method of using a display, an AMBER Alert notice is remotely transmitted to law enforcement vehicles (or any other vehicle connected to an AMBER Alert network), the notice is received by the controller and an appropriate notice is placed on the display for the vehicle. Certain overrides are contemplated to avoid the notice being displayed at a dangerous moment (i.e. speed, when other messages are displayed, etc.). By providing the public with rapid notice of a child missing in their region and circumstances surrounding the missing child, the public can more quickly respond to the need and provide more timely information to law enforcement. Currently, AMBER alerts are provided on some highway signs to provide the community faster notice, but even more alerts could be provided by linking the law enforcement vehicles into a similar system and providing the vehicles with appropriate display capability.

Other Emergency Vehicles

In addition to law enforcement vehicles, other emergency vehicles such as fire engines, tow trucks, ambulances, rescue vehicles, and the like, may benefit significantly from use of a see-through display system as described herein. For all emergency vehicles, applicability of the AMBER alert warnings as described above would significantly increase the likelihood that the kidnapped child will be found. Additionally, many traffic accidents occur while motorists are trying to maneuver around existing accidents surrounded by emergency vehicles. With one or more see-through display signs on the vehicle, either in a window or mounted to the side or back of the vehicle, traffic can be directed automatically without requiring an officer or other emergency worker to stand and direct traffic. Many times a "<<<Move Left—Proceed With Caution" message would be all that is required to reduce the risk of additional accident and increase the safety with which traffic is directed around an accident. Because the displays are see-through, even if the display, for example a net embodiment, is mounted on the side of a vehicle, the pictures and vehicle coloring will be visible through the display. When the display is lit, preferably in a color different than the color of the side of the vehicle, the message will be readable to passers-by.

Construction and Utility Vehicles

Construction and utility vehicles are another industry in which vehicle-mounted displays are particularly useful. Typically, when construction or utility workers are doing work on a particular road or along a particular road, the construction or utility company orders one or more portable lighted signs to be delivered to the job site and the signs remain there until the delivery company comes to pick up the signs when the work is done. If the stretch of road on which the workers are working, even if only to collect garbage, is long, sometimes two or more signs are needed along the road. Many times, however, because there are not signs available, because cost for renting the signs is an issue, or because the time during which the work will be done is too short, construction workers perform the work without lighted signs. By providing the construction and utility vehicles with lighted displays, the workers can enjoy the protection of a lighted sign while working beside any road at any time. Additionally, only the single sign in the truck would be required even when the workers are working along a long stretch of road because the sign can easily be moved (with the truck) when the workers move down the road. Even if the work is done only for a short time, the protection of a lighted sign can be in place. The lighted display may be mounted in the rear window of the vehicle, on a window grill or other window protector, may be mounted to a frame supported by the vehicle, or even merely to the side or back of the vehicle.

Many advantages would also be obtained by using an embodiment of the present invention in a pace car at a construction site. A pace car is used where only one direction of traffic flow is open at a time. Traffic at one end of the road is stopped while the cars flowing the opposite direction are allowed to pass by slowly following a pace car. If the pace car had a lighted display, the display could be used to direct the vehicles to follow the pace car, or to stop at one end of the stretch of road.

For many construction- and utility-type applications, it is expected that the controller will be coupled to the speedometer and/or neutral switch of the vehicle, much like with the law enforcement vehicle example provided above, so that the display will not unintentionally be left on while the vehicle is moving. In some cases, like with a pace car, the display will need to be lighted to display particular messages while the vehicle is moving. In such cases, the controller may be programmed to display the message only if the vehicle remains below a particular speed of travel.

School Bus

School buses are another vehicle that would benefit greatly from increased safety through use of a display configured according to an embodiment of the present invention. Conventional school bus warning lights comprise flashing tail lights and a small, red, hexagonal sign that extends adjacent the driver's window that says "Stop". The law requires that all motorists stop and not pass the bus in either direction when a school bus stops to let children exit the bus. One problem associated with the very small signs used by most buses is that many motorists miss seeing the signs and lights until it is too late, or do not realize the small stop sign has extended. Because of the width of the back of the bus, there are typically three windows extending across the back of the bus, the center window sometimes being on the emergency exit door. In one particular application of the present invention, a display is placed in each of the two side back windows, the display area being shaped like a hexagon or stop sign and formed of red lights. Alternatively, a large square may be formed. In the center back window, the word "STOP" or words "DO NOT PASS" are flashed to warn surrounding drivers in a more noticeable manner than the typical side sign. Of course, AMBER Alerts and other messages could also be displayed on school buses as with other vehicles.

Public Transportation

Public transportation is another type of vehicles that would benefit from embodiments of the present invention. Buses, taxis and other public transportation vehicles often display advertising material as well as other material on their sides and back panels. In addition to the ability to more clearly indicate to observers that the driver has applied the brakes or that the vehicle is ready for service or is traveling to a particular location, commercial advertisements may be displayed. According to a particular method of the invention, one of the wireless remote inputs 15 is configured to receive data from a central location relating to commercial advertisements to be shown on the display, the controller 4 receives the indication of which commercial advertisement to show, accesses data from the memory 8 and displays the indicated commercial advertisement. When coupled with a global positioning system (GPS) receiver as a wireless remote input 15 or otherwise coupled to the controller, the controller is capable of displaying commercial advertisements relevant to the particular region in which the public transportation is traveling. For example, if a taxi is traveling through a downtown area and a commercial sponsor has a place of business in that area, the controller may be programmed to display that sponsor's commercial when the taxi is in that area. AMBER Alert notices provided through all public transportation in a particular region will more quickly catch the attention of passers by and spread the word of the child abduction.

General Public Vehicles

Another industry in which embodiments of the present invention are particularly useful are vehicles owned by the general public. Like with other vehicles, general public vehicles will benefit from the back window of the vehicle lighting-up red when the driver applies the brakes. However, there are other situations unique to the general public in which a large see-through display in the back window would be helpful. The see-through aspect of the invention is particularly useful for general public vehicles because the general public is accustomed to relying upon the rear view mirror to track their surroundings. If the rear window were blocked by a non-see-through display, this would interfere with the drivers' ability to drive the vehicle.

When a vehicle is stranded on the side of the road, it is often unclear to passers-by why the vehicle has stopped, and whether the vehicle occupants still need help. Additionally, occupants of vehicles who need to stop by the side of the road are often frightened that a would-be assistant who stops to help will harm them. At night too, it is often difficult to see if a vehicle along the side of the road still has occupants and, with small hazard lights it is often difficult to even see that a vehicle is there. It is contemplated that many pre-programmed and custom messages may be appropriately used in situations where a vehicle is stopped along the side of the road. Some examples include, but are not limited to, "CALL 911" (to get emergency help there and deter any would-be attackers), "NEED TOW" (to flag down a tow truck or allow passers-by to call for help), "HELP ON THE WAY" (if confirmation of help on the way has been received, but it has not arrived yet). These and many other notices and information can simplify the concern of the vehicle occupants and passing drivers. Additionally, just a bigger, brighter set of hazard lights flashing will more clearly identify the vehicle as being along side of the road and in need of help so that the highway patrol or other passer-by can help.

When driving around town too, a notice of "SLOW CAR" in addition to the hazard lights flashing on a vehicle will provide additional notice to surrounding vehicles that the vehicle of interest is traveling at a speed lower than the speed limit. Turn signals may also be provided so that they fill a large portion of the back window of a vehicle in addition to the small turn signals on a typical vehicle. The larger, yet see-through, turn signals will provide more obvious notice of the vehicle turning to avoid collisions. Like the controller 4 (FIG. 1) may be coupled to the brake or neutral switch of the vehicle, it may also be coupled to the turn signal switches for this purpose.

According to yet another aspect of the invention, the controller 4 (FIG. 1) is coupled through an external input 14 to the alarm system of the vehicle and senses whether the alarm is triggered. If the alarm is triggered, the controller displays a message such as "CAR STOLEN—PLEASE REPORT" on the back window display. Because the controller system is separate from the audible alarm system of the car, even if the thief cuts the wires to the alarm, the alert would be shown on the back window of the vehicle. The display 10 may be coupled directly to the battery of the car and provided with its own memory chip in particular designs so that even if the display connection to the controller is interrupted, the display can still display the message until the alarm is validly cleared. In many cases, the driver may not even know the message is showing. If he does know the message is showing, it will likely be something of a deterrent to the thief taking the car.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A lighted vehicle display for a vehicle window, the display comprising:
a plurality of display pixels mounted with substantially even row spacing on each of a plurality of printed circuit boards, the plurality of display pixels throughout a display area of the display mounted in a window of a vehicle, wherein the display area fills a majority of the window; and
a controller operatively associated with each of the display pixels and configured to control each of the display pixels separately from the other display pixels to display variable information in the window of the vehicle;
wherein the display area is see-through for approximately 25% or more of the display area such that a line of sight through the display from a driver's seat in the vehicle to outside the window of the vehicle.

2. The lighted vehicle display of claim 1, wherein the display area is see-through for approximately 50% or more of the display area.

3. The lighted vehicle display of claim 1, wherein the display area is see-through for approximately 75% or more of the display area.

4. The lighted vehicle display of claim 1, wherein the controller further comprises a manual interface comprising a display.

5. The lighted vehicle display of claim 1, wherein the display pixels comprise at least one of light emitting diodes and fiber optic segments.

6. The lighted vehicle display of claim 1, wherein the printed circuit boards extend across a majority of the length of the display area in a plurality of horizontal rows.

7. The lighted vehicle display of claim 6, further comprising at least one signal bus electrically coupled to an end of the plurality of horizontal rows.

8. The lighted vehicle display of claim 7, wherein the horizontal rows are further pivotally coupled to the at least one signal bus so that a viewing angle for one or more of the horizontal rows is adjustable.

9. The lighted vehicle display of claim 6, wherein the horizontal rows are mounted to a frame adjacent an angled window at an angle with respect to the vehicle window such that the light elements shine through the window substantially parallel with the ground but positionally follow the angle of the window.

10. The lighted vehicle display of claim 1, wherein each display pixel comprises at least two light elements.

11. The lighted vehicle display of claim 1, wherein the plurality of printed circuit boards are spaced at approximately 1 inch intervals and each display pixel comprises a 3 millimeter color LED.

12. The lighted vehicle display of claim 1, wherein the plurality of printed circuit boards are spaced at approximately 1 inch intervals, each display pixel comprises a 5 millimeter color LED.

13. A lighted vehicle display for a vehicle window, the display comprising:
a plurality of light emitting diodes coupled to each of at least seven horizontal rows of printed circuit boards in a display area, the display area bounded by a frame mounted adjacent to and substantially parallel with a window of a vehicle, wherein the display area fills a majority of the window; and
a controller operatively associated with each of the light emitting diodes and configured to control each of the light emitting diodes separately from the other light emitting diodes to display variable information in the window of the vehicle;
wherein the display area is see-through for approximately 25% or more of the display area such that a line of sight through the display from a driver's seat in the vehicle to outside the window of the vehicle.

14. The lighted vehicle display of claim 13, wherein the horizontal rows are mounted at an angle with respect to the frame such that the light emitting diodes shine through the window substantially parallel with the ground.

15. The lighted vehicle display of claim 13, wherein the display area is see-through for approximately 50% or more of the display area.

16. The lighted vehicle display of claim 13, wherein the display area is see-through for approximately 75% or more of the display area.

17. The lighted vehicle display of claim 13 wherein the printed circuit boards extend across a majority of the length of the display area.

18. The lighted vehicle display of claim 13, further comprising at least one signal bus electrically coupled to an end of each of the seven horizontal rows.

19. The lighted vehicle display of claim 13, wherein the horizontal rows are further pivotally coupled to the at least one signal bus so that a viewing angle for one or more of the horizontal rows is adjustable.

20. The lighted vehicle display of claim 13, wherein the horizontal rows are mounted to a frame adjacent an angled window at an angle with respect to the vehicle window such that the light elements shine through the window substantially parallel with the ground but positionally follow the angle of the window.

* * * * *